US008197559B2

(12) United States Patent
Abe et al.

(10) Patent No.: US 8,197,559 B2
(45) Date of Patent: Jun. 12, 2012

(54) PROCESS FOR THE CONTINUOUS HYDROGENATION OF TRIGLYCERIDE CONTAINING RAW MATERIALS

(75) Inventors: Detlef Abe, Angermunde (DE); Frank Eschenroder, Schwedt (DE); David Laban, Schwedt (DE); Hartmut Schutter, Schwedt (DE); Laurent Bournay, Chaussan (FR); Thierry Chapus, Lyons (FR); Nathalie Dupassieux, Lyons (FR)

(73) Assignee: IFP Energies nouvelles, Rueil Malmaison Cedex (FR)

( * ) Notice: Subject to any disclaimer, the term of this patent is extended or adjusted under 35 U.S.C. 154(b) by 287 days.

(21) Appl. No.: 12/717,403

(22) Filed: Mar. 4, 2010

(65) Prior Publication Data
US 2010/0242349 A1 Sep. 30, 2010

(30) Foreign Application Priority Data

Mar. 4, 2009 (EP) .................................... 09003140

(51) Int. Cl.
*C10L 1/19* (2006.01)
(52) U.S. Cl. .......... 44/398; 585/240; 585/638; 585/639; 585/640; 585/733; 208/57; 208/142; 208/143; 208/144
(58) Field of Classification Search .................... 44/398; 585/240, 638–640, 733; 208/57, 142–144
See application file for complete search history.

(56) References Cited

U.S. PATENT DOCUMENTS
2009/0301932 A1* 12/2009 Gomes et al. .................... 208/60
2010/0133144 A1* 6/2010 Kokayeff et al. ............... 208/57

FOREIGN PATENT DOCUMENTS
WO WO 2007/003709 A1 1/2007
WO WO 2007/125332 A1 11/2007
WO WO 2007/141293 A1 12/2007
WO WO 2008/058664 A1 5/2008

OTHER PUBLICATIONS
European Search Report of EP 09 00 3140 (Jun. 4, 2009).
* cited by examiner

*Primary Examiner* — Walter D Griffin
*Assistant Examiner* — Brian McCaig
(74) *Attorney, Agent, or Firm* — Millen, White, Zelano & Branigan, P.C.

(57) ABSTRACT

Process for the continuous hydrogenation of triglyceride containing raw materials in a fixed bed reactor system having several catalyst beds arranged in series and comprising hydrogenation catalyst. The raw material feed, hydrogen containing gas and diluting agent are passed together through the catalyst beds at hydrogenation conditions. The raw material feed stream as well as the stream of hydrogen containing gas are divided into an equal number of different partial streams. These are each passed to one catalyst bed in such a manner that the weight ratio of diluting agent to raw material feed is essentially the same at the entrance of all catalyst beds and does not exceed 4:1. The claimed process is preferably conducted at low temperatures and allows the utilization of existing units due to the low recycle ratio. Further, a sufficient excess of hydrogen is used so that no valuable product is lost through decarb-reactions.

19 Claims, 1 Drawing Sheet

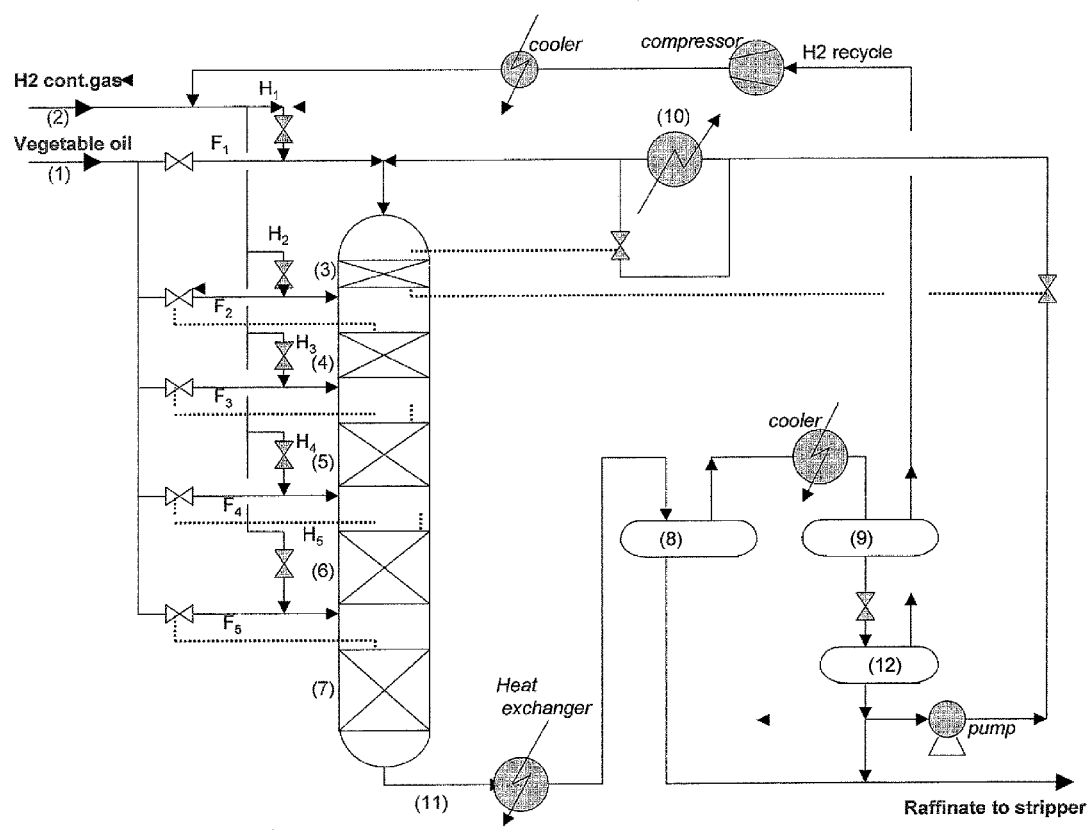

PROCESS FOR THE CONTINUOUS HYDROGENATION OF TRIGLYCERIDE CONTAINING RAW MATERIALS

The invention relates to an improved process for the continuous hydrogenation of triglyceride containing raw materials like vegetable oils in a fixed bed reactor system having several catalyst beds comprising hydrogenation catalyst.

The use of renewable sources like vegetable oils in fuel production is steadily increasing. Since neat oils and fats of biological origin display inferior properties, there have been a considerable number of proposals for converting such materials into more satisfactory fuel products. A comprehensive overview of the prior art, which is hereby included by reference, is provided in EP 1 741 768 A1.

One possibility for improvement is the catalytic hydrotreating of animal and vegetable oils and fats to produce saturated hydrocarbons which e.g. may be useful as diesel and/or kerosine fuels. Such hydrotreating comprises the removal of unsaturations and the hydrodeoxygenation of the triglycerides. Due to the highly exothermic nature of these reactions, temperature control is very important to avoid undesirable side reactions. Such side reactions are further promoted by free fatty acids which are present in considerable amounts in animal and vegetable oils and fats. To mitigate these problems it is proposed in EP 1 741 768 A1 to subject such biological materials containing more than 5 weight % of free fatty acids to catalytic hydrotreating at a reaction temperature of 200 to 400° C. in the presence of a diluting agent, the ratio of dilution agent to fresh feed being 5-30:1. The dilution agent is preferably recycled products of the process.

However, the process proposed in EP 1 741 768 A1 still has some serious disadvantages. Thus, the amount of recycle to provide the necessary amount of diluting agent is very high. This constitutes a high hydraulic downstream load of the reactor and requires considerable revamp of existing units in order to provide the required enlarged reactor volume. Further, EP 1 741 768 A1 teaches to reduce the hydrogen consumption by promoting deoxygenation through decarb-reactions (formation of CO and $CO_2$ from carboxylic oxygen) through suitable selection of the hydrotreatment catalyst. However, such deoxygenation of the triglycerides results in loss of valuable paraffin product, deactivation of catalyst due to the inhibiting effect of CO and high corrosiveness due to the presence of $CO_2$.

Therefore it is the object of the present invention to provide a process using less recycle, requiring less revamp of existing units, minimizing corrosion caused by free fatty acids and/or essentially avoiding losses of valuable paraffinic product and the other above-mentioned disadvantages due to deoxygenation of triglycerides through decarb-reactions.

Accordingly the invention is directed to a process for the continuous hydrogenation of triglyceride containing raw materials like vegetable oils in a fixed bed reactor system having several catalyst beds comprising hydrogenation catalyst as defined in claim 1. The sub-claims are directed to preferred embodiments of the invention, while details and advantages of the invention will become apparent from the following description.

In the following the invention will be described with reference to FIG. 1 which shows a process scheme suitable for carrying out the invention.

In the process according to the invention the triglyceride containing raw material, hydrogen containing gas and diluting agent are passed together through the catalyst beds of the reactor system at hydrogenation conditions, which beds are arranged in series. The triglyceride containing raw material can be any vegetable and animal oil or fat. Such materials are for example disclosed in EP 1 741 768 A1, which disclosure is included by reference. Well suited are for example sunflower oil, olive oil, peanut oil, coconut oil and beef tallow, while vegetable oils and fats like Jatropha oil, palm oil, soybean oil and rapeseed oil are preferred.

The hydrogen containing gas can consist of pure hydrogen or comprise further components which preferably are inert, which means that they do not react with the trigylceride containing raw material under the conditions of the process according to the invention. Typically, such hydrogen containing gases are produced from steam reformers as well as catalytic reformers. In practice suitable gases may contain 75 to 95 vol. % hydrogen, the balance being hydrocarbons like methane, ethane, propane and butane. Hydrogen is used in excess (e.g. at least 50%, preferably 75 to 400% and even more preferred 100 to 300%, like 150%) of the theoretical hydrogen consumption and its amount is controlled by the hydrogen partial pressure, which is preferably in the range of 10 to 80 bar.

Except for the start-up phase the diluting agent is the product from the process according to the invention. Accordingly the term diluting agent comprises the hydrogenation product formed in every catalyst bed as well as the specific fraction thereof as defined in feature b) of claim 1, which is recycled to the reactor inlet at the first catalyst bed and is referred to as added diluting agent. During start-up any suitable hydrocarbon, e.g. light gas oil, can be used as added diluting agent until enough hydrogenation product is available for recycle to the reactor inlet at the first catalyst bed.

Referring to FIG. 1, the raw material feed (here vegetable oil) is supplied through line 1, while the hydrogen containing gas is supplied through line 2. Both streams are divided into different partial streams ($F_1, F_2 \ldots F_n$ and $H_1, H_2 \ldots H_n$) and the smallest partial feed stream ($F_1$) is mixed with the smallest partial stream of hydrogen containing gas ($H_1$), the next larger partial feed stream ($F_2$) is mixed with the next larger partial stream of hydrogen containing gas $H_2$ and so on. The so obtained partial mixed streams are passed to one catalyst bed respectively such that the smallest partial mixed stream ($F_1$+$H_1$) is passed to the first catalyst bed (3) at the top of the fixed bed reactor system, the next larger partial mixed stream ($F_2$+$H_2$) is passed to the second catalyst bed (4), and so on so that the largest partial mixed stream ($F_5$+$H_5$) is passed to the last catalyst bed (7) at the bottom of the fixed bed reactor system. Before the first partial mixed stream ($F_1$+$H_1$) enters the first catalyst bed (3) it is mixed with added diluting agent. Similarly, the further partial mixed streams ($F_2$+$H_2$; $F_3$+$H_3$; etc.) are mixed with the components (hydrogenation product, unreacted hydrogen containing gas, added diluting agent) from the previous catalyst bed in mixing zones between the catalyst beds of the fixed bed reactor system.

Alternatively, but less preferred, the partial feed streams and the corresponding partial streams of hydrogen containing gas are fed directly to mixing zones before the first catalyst bed and between the catalyst beds of the fixed bed reactor system without prior mixing.

The temperature of the raw material feed stream and the partial feed streams is less than 80° C., but high enough to allow suitable transport of the raw material feed to the reactor system, i.e. the viscosity of the raw material must be appropriate. Similarly the temperature of the hydrogen containing gas is as low as reasonable under practical aspects since low hydrogen temperatures are advantageous with respect to quenching the hydrogenation product leaving the catalyst beds and also with respect to the amount of added diluting agent required at the inlet of the first catalyst bed. However, since the hydrogen has to be compressed to the desired pressure in the reactor system which leads to an increased temperature, the compressed hydrogen is often cooled to a suitable temperature. In practice the hydrogen temperature should not exceed 110° C. and mostly is within the range of 40 to 100° C., like 50° C.

The temperature of the partial mixed stream introduced at the reactor inlet at the first catalyst bed is further adjusted with added diluting agent, which is a specific fraction of the hydrogenation product obtained by the present process. It is recovered from the reactor exit product mixture by separation in two steps without controlled pressure reduction at 145 to 280° C. (high temperature separator 8) and 15 to 60° C. (low temperature separator 9). This adjustment of the temperature at the reactor inlet is supported by heat exchanger (10), if required or desirable.

In a preferred embodiment the condensate of the specific fraction obtained from the second separation step is expanded in degassing vessel (12) before it is recycled to the reactor inlet at the first catalyst bed.

The temperature at the reactor inlet at the first catalyst bed should be adjusted so that the temperature at the outlet of the first catalyst bed is preferably not higher than 280° C. A suitable temperature at the reactor inlet at the first catalyst bed may be for example 200° C., which temperature due to the hydrogenation reaction rises to for example 250° C. at the outlet of the first catalyst bed. The hydrogenation of the raw material shall be essentially complete in the first bed and also in the following beds.

To the hydrogenation product leaving the first catalyst bed (3) the second partial mixed stream of raw material and hydrogen containing gas ($F_2+H_2$) is added in such an amount that the weight ratio of diluting agent to raw material feed is essentially the same as that at the entrance of the first catalyst bed (3). If said ratio is for example 4:1 at the entrance of the first catalyst bed (3), then the amount of fresh raw material feed ($F_2$) introduced by the second partial mixed stream ($F_2+H_2$) must be larger by a factor of 1.25 than the amount of raw material feed ($F_1$) introduced by the partial mixed stream ($F_1+H_1$) at the entrance of the first catalyst bed (3) so that the weight ratio of diluting agent (added diluting agent and diluting agent formed in the first catalyst bed) is again 4:1. Similarly, it is preferred that the amount of hydrogen ($H_2$) provided by the second partial mixed stream ($F_2+H_2$) is by a factor of 1.25 larger than the amount of hydrogen provided by the first partial mixed stream ($F_1+H_1$) in order to maintain the same hydrogen excess in the second catalyst bed (4) as in the first catalyst bed (3).

By the addition of the second partial mixed stream ($F_2+H_2$) to the hydrogenation product exiting the first catalyst bed (3) the temperature of the latter is reduced so that the newly formed mixture entering the second catalyst bed (4) has an acceptable lower temperature, e.g. 200° C., so that the reaction conditions in catalyst beds (3) and (4) are preferably essentially the same.

The hydrogenation product leaving the second catalyst bed (4) is mixed with the third partial mixed stream ($F_3+H_3$), the amount of which is by the same factor, e.g. 1.25, larger than the preceding partial mixed stream ($F_2+H_2$), i.e. the amount of fresh raw material feed ($F_3$) added through the third partial mixed stream ($F_3+H_3$) is by the same factor, e.g. 1.25, larger than the amount of fresh raw material feed ($F_2$) introduced by the second partial mixed stream ($F_2+H_2$). The same preferably applies to the amount of hydrogen ($H_3$) introduced by the third partial mixed stream ($F_3+H_3$) in order to maintain the same hydrogen excess in the third catalyst bed (5) as in the first and the second catalyst beds (3, 4).

The mixture of the hydrogenation product leaving the second catalyst bed (4) and the third mixed stream ($F_3+H_3$) is then introduced into the third catalyst bed (5).

The described procedure is repeated with every hydrogenation product leaving the following catalyst beds before entering the next catalyst bed.

In order to improve the temperature control the valves regulating the partial streams of raw material and hydrogen containing gas can be actuated by the temperature values at the catalyst bed inlets and outlets so as to adapt the partial streams of raw material feed and hydrogen containing gas as well as the stream of added diluting agent during operation in such a manner that the desired temperatures at the entrance of the catalyst beds and in the catalyst beds are maintained. This is exemplified by the dotted lines in FIG. 1. Furthermore, temperature control can be influenced by varying the temperature of the raw material feed and the hydrogen containing gas fed to the reactor system (see above).

The hydrogenation product leaving the last catalyst bed (7) is removed through line 11 and passed to the above described separation steps. The part of the hydrogenation product which is not recycled for addition to the first partial mixed stream can be subjected to further processing, like isomerization or hydrocracking as well as blending with refinery components, in order to produce upgraded products, preferably kerosine or diesel fuels.

From the above follows that diluting agent is only added to the first partial mixed stream entering the reactor inlet and passing through the first catalyst bed. Between the catalyst beds no further diluting agent is added, but the total amount of diluting agent increases by the amount of hydrogenation product formed in the catalyst beds. Preferably the weight ratio of added diluting agent (specific fraction of the hydrogenation product obtained by the process according to the invention as defined in feature b) of claim 1) to total raw material feed is less than 1, more preferred less than 0.5, even more preferred less than or equal to 0.4 and even more preferred less than or equal to 0.2 (e.g. about 0.4 or about 0.2 as in Example 3). Depending on the number of catalyst beds said ratio can be as low as 0.1 or even 0.05.

It is preferred that the partial feed streams and the partial streams of hydrogen containing gas are all mixed at the same ratio of standard cubic meter of gas to cubic meter of raw material feed. Similarly, it is preferred that the amount of partial mixed streams to the second and the following catalyst beds is controlled so as to adjust the temperature at the inlet of every catalyst bed to essentially the same temperature as that at the reactor inlet at the first catalyst bed.

The reactor system suitable for carrying out the process according to the invention may comprise any suitable number of catalyst beds. Usually it comprises more than 3, preferably more than 4, and in particular more than 5, but less than 20, preferably less than 15 and in particular less than 10 catalyst beds. In other words n is preferably 4 to 19, more preferred 5 to 14 and particularly preferred 6 to 9.

Suitable hydrogenation catalysts are well known in the art (see e.g. W. Reschetilowski "Hydroraffinationskatalysatoren in der Erdölverarbeitung—Stand and Perspektiven", Chemie Ingenieur Technik, June 2007, Vol. 79, 729-740). Preferably the hydrogenation catalyst is selected from one or more sulfided elements of Groups 6, 8, 9 and 10 of the Periodic System (IUPAC Periodic Table of the Elements). Particularly preferred are nickel, molybdenum, cobalt and/or tungsten. Usually the hydrogenation catalyst is supported, preferably on $Al_2O_3$.

Unless specified otherwise, the process according to the invention is carried out at hydrogenation conditions generally known in the art, see e.g. EP 1 741 768 A1. Accordingly the pressure can be within the known ranges of 20 to 150 bar, preferably between 50 and 100 bar.

As stated above, hydrogen is used in excess. In the process according to the invention it is preferred that the ratio of hydrogen to raw material feed is in the range of 100 to 1,000 $Nm^3/m^3$.

To avoid side reactions, in particular decarbonylation/decarboxylation, the hydrogenation preferably takes place at temperatures of 145 to 280° C. Since during hydrogenation the temperature increases, the temperatures at the entrances of the catalyst beds have to be controlled so that the temperature of the reaction mixture exiting the catalyst bed is not too high and preferably not above 280° C. Preferably the temperature at the entrances of the catalyst beds should not be higher than 250° C., more preferably said temperature is 220° C. or less.

To run the process according to the invention optimally the space velocity (LHSV) of the raw material feed in each bed should be in the range from 0.1 to 5 $m^3/m^3$ catalyst/h and preferably in the range from 0.1 to 1 $m^3/m^3$ catalyst/h, while the linear velocity of the liquid material should be in the range from 1 to 6 mm/s. Such low linear velocities are advantageous to achieve low pressure drop, optimal hold up and consequently maximum target conversion, and are not achieved with high recycle ratios as disclosed in the prior art.

The volume of the catalyst beds may increase in flow direction in order to secure essentially the same space velocity for each fresh raw material feed stream ($F_1$ to $F_n$). Thus, it is preferred that the space velocity based on the fresh raw material introduced into each catalyst bed is about the same in all catalyst beds and is within the above stated range. However, the linear velocity of the raw material feed in each catalyst bed is different and increases from bed to bed in downstream direction, but should be in the above stated range in all beds.

For processes like the one according to the invention usually trickle bed reactors are used. The reactants (fresh feed and hydrogen) are passed through the reactor in cocurrent flow from the top to the bottom of the reactor. Such reactors are well known and are preferably used in the present invention (see e.g. U.S. Pat. No. 7,070,745 B2, in particular column 1; Andreas Schulze "Entwicklung der Strukturen der Erdölraffinerien in Deutschland, Jun. 27, 2005, scheme "Hydroraffination (Hydrotreating)").

It is essential in the process according to the invention that each partial stream of raw material feed following in downstream direction being that much larger than the preceding one that the weight ratio of diluting agent to raw material feed is essentially the same at the entrance of all catalyst beds and does not exceed 4:1. Thus, it is preferred that the weight ratio of diluting agent to raw material feed at the reactor entrance is 4:1 or less and each partial stream of fresh raw material feed is by a factor of 1.25 or more larger than the previous partial stream. Depending on the specific raw material feed, the desired process conditions and the desired hydrogenation products weight ratios of diluting agent to raw material feed down to 1:1 are feasible in practice.

Preferably also each partial stream of hydrogen containing gas following in downstream direction is larger than the preceding one by essentially the same factor as the corresponding partial streams of raw material feed with which they are mixed. Accordingly it is preferred that in the embodiment mentioned above also each partial stream of hydrogen containing gas is by a factor of 1.25 or more larger than the previous partial stream.

The process according to the invention provides important benefits in that only a minimum of recycle based on the total fresh raw material is required. This in turn results in a low downstream hydraulic load of the reactor and allows the use of existing units without considerable revamp. In comparison, temperature control in the prior art like in the process disclosed in EP 1 741 768 A1 requires high amounts of recycle which in turn means high investments and high operation costs. Furthermore, the high dilution is disadvantageous with respect to the required quick transport of hydrogen to the catalytic centers of the hydrogenation catalyst.

Another advantage of the process according to the invention is its high flexibility which means that practically all available triglyceride containing raw materials can be processed despite the fact that the exothermy of suitable raw materials like oils and fats varies considerably.

Furthermore, the process according to the invention is flexible insofar as it allows coprocessing with mineral oils without problems, e.g. straight run fractions like heavy gasoline, kerosine, light gas oil and the like, namely by injecting the mineral oil together with the triglyceride containing raw material. Since such mineral oil constituents also have a "diluting effect" it is often possible to further reduce the amount of recycle. For removing sulfur and optionally also nitrogen from the mineral oil constituents a second reactor is positioned between the above described fixed bed reactor system and the high temperature separator 8 and the low temperature separator 9, which reactor operates at for this purpose required higher temperatures above 280° C., e.g. 310 to 330° C. If the product obtained by the process of the present invention shall be subjected to further processing like isomerization with noble metal catalysts sensible to nitrogen, then such a second reactor is useful even if only vegetable oil is processed in order to remove the low amount of nitrogen containing molecules (5 to 10 ppm) which are contained in vegetable oils and are not removed at the low temperatures in the first fixed bed reactor system for the continuous hydrogenation according to the present invention.

Coprocessing with mineral oils is of particular importance when carrying out the process according to the present invention in existing units since it allows capacity utilization sharing corresponding to the specific requirements of a refinery. Thus, if an existing unit cannot be completely reserved for processing of vegetable oils, its capacity can be used partly for hydrotreating of mineral oil fractions and partly for the hydrogenation of vegetable oils in accordance with the present invention. In this manner mineral oil constituents in an amount of up to ⅓ of the raw material feed stream can be used and hydrotreated together with the vegetable oil constituents.

In the upstream region the temperature of the triglyceride containing raw material is low so that there is no corrosion by free fatty acids. This allows the use of existing equipment since stainless steel is not required.

In the process according to the invention a maximum yield to valuable paraffin product like diesel and kerosine fuels is achieved and there are practically no C-losses by side reactions forming CO and $CO_2$. Thus, also downstream corrosion is minimized.

Due to the comparatively low temperatures used throughout the process and due to the fact that undesirable temperature peaks are avoided, the invention provides an extremely mild conversion of the triglyceride containing raw material without side reactions impairing the quality of the liquid product and without catalyst damage.

Comparative Example 1

In accordance with the usual well known hydrotreating of diesel a Jatropha oil, as characterized in Table 1, was hydrotreated at 1.0 LHSV (liquid hourly space velocity), 40 barg and 700 liters $H_2$ per liter of fresh feed in a pilot reactor with 3 catalyst beds which contained commercial CoMo catalyst in a ratio of 1:2:4.

The average catalyst bed temperature obtained from 5 measuring points in the reactor was 362° C. for a test period of 100 hours. It was remarkable that despite the great jacket metal block with high heat dissipation typical for pilot plants considerable deviations from the desired isothermy of up to 20° C. were observed. These observations are in agreement with pilot test results which were recently reported by others (Karl Hutter "CO-Processing of BIO Oils in HDS/HDN Vienna Albemarle's $9^{th}$ Pre-ERIC Semianr 17 Nov. 2008).

The balance of the test period resulted in the following average yield structure:

| | |
|---|---|
| $C_{4-}$ | 19.9 wt. % on feed |
| $CO/CO_2$ | 0.6/9.2 wt. % on feed |
| $H_2O$ | 4.9 wt. % on feed |
| Raffinate | 70.5 wt. % on feed |

Despite the high decarbonylation/decarboxylation the chemical consumption of $H_2$ was determined at a very high value of 5.1 wt. % on feed due to the obviously considerable hydrocracking of valuable liquid products to light gases. The high degree of hydrocracking is particularly surprising in view of the high CO partial pressure which usually has an inhibiting effect on the activity of the hydrotreating catalysts. Probably the temperatures at the active catalyst sites were much higher than actually measured and caused increased cracking as well as quick desorption of CO.

TABLE 1

| Vegetable oil | Jatropha | Palm |
|---|---|---|
| Fatty acid composition, wt % | | |
| C 16:0 | 15.4 | 44.1 |
| C 18:0 | 6.5 | 4.5 |
| C 18:1 | 40.0 | 39.2 |
| C 18:2 | 36.6 | 9.9 |
| Others | 1.5 | 2.3 |
| Oxygen, wt % | 11.4 | 11.3 |

Comparative Example 2

In accordance with known technology for vegetable oils palm oil, as characterized in Table 1, was hydrotreated at 1.0 LHSV, 50 barg and 800 liters $H_2$ per liter of fresh feed in a reactor with 3 catalyst beds which contained commercial NiMo catalysts in a ratio of 1:2:4.

The obtained liquid product was recycled to the reactor entrance until a ratio of 6 parts by volume recycle to 1 part by volume fresh feed was established. Both components were heated stepwise to 285° C. before introduction into the reactor. The temperature at the reactor exit was 320° C. The average yields for the following test period of 100 hours are summarized in Table 2. The chemical $H_2$ consumption was determined at 2.24 wt. % based on fresh feed.

After a test period of 480 hours an increase of the density of the raffinate indicated a reduction of the conversion and thus a deactivation of the catalyst which may be caused by the CO partial pressure. To balance this deactivation the temperature had to be raised by about 15° C. However, this resulted in a reduction of the raffinate yield of 0.6 wt. %.

The test was repeated with fresh catalyst at the same conditions except for an increased recycle of raffinate from 6 to 12 parts by volume to 1 part by volume fresh feed. The reactor entrance temperature was controlled at 300° C. The temperature at the reactor exit was 315° C., but varied considerably accompanied by also considerable pressure variations. The unusually high cross section load obviously resulted in flooding and unstable operation so that the test had to be discontinued. To achieve a stable operation a considerably bigger reactor would have been required.

Comparative Example 3

In accordance with known technology for vegetable oils palm oil, as characterized in Table 1, was hydrotreated at 0.3 LHSV, 50 barg and 900 liters $H_2$ per liter of fresh feed in a reactor with 5 catalyst beds which contained commercial NiMo catalysts in a ratio of 1:1.5:2:2.5:3.

The obtained liquid product was recycled to the reactor entrance until a ratio of 6 parts by volume to 1 part by volume fresh feed was established. Both components were heated stepwise to 280° C. before introduction into the reactor. The temperature at the reactor exit was 330° C. The average yields for the following test period of 120 hours are also summarized in Table 2. The chemical $H_2$ consumption was determined at 2.31 wt. % based on fresh feed.

Example 4

The same palm oil as in Examples 2 and 3 was used at 0.3 LHSV based on fresh feed, 50 barg and 900 liters $H_2$ per liter fresh feed in an adiabatic reactor with 5 catalyst beds (3 to 7 in FIG. 1) which contained the same commercial NiMo catalyst as in Examples 2 and 3 in a ratio of 1:1.5:2:3:4.5.

As shown in FIG. 1 palm oil, which was stored above the pour point at 60° C., was without any additional heating divided into 5 partial streams $F_1$, $F_2$, $F_3$, $F_4$ and $F_5$ and mixed with partial hydrogen streams $H_1$, $H_2$, $H_3$, $H_4$ and $H_5$ in a ratio of 900 liters per 1 liter of fresh feed. The partial hydrogen streams were provided at 50° C. at a pressure slightly above the pressure of the reactor. After mixing partial stream $F_1$ with partial hydrogen stream $H_1$ a specific fraction was added as diluting agent in order to control the temperature at the reactor entrance as well as the average temperature of the first catalyst bed. The former is mainly controlled by the adjustment of the temperature of the specific fraction, while the latter is mainly controlled by the amount of the specific fraction.

The specific fraction had a temperature of 315° C. and was added to the partial mixed stream of fresh feed and hydrogen ($F_1+H_1$) in an excess of 2.2 based on the weight of the fresh feed. The temperature at the reactor entrance was 210° C. and the average temperature in the first catalyst bed was 245° C.

The specific fraction used as diluting agent was obtained from the product mixture exiting the reactor through line (11) by separation in two steps at almost reactor exit temperature (high temperature separator 8) and 45° C. (low temperature separator 9) and by subsequent expansion of the condensate obtained at 45° C. to 5 Barg in degassing vessel (12).

By controlling the amount of the cold fresh feed/$H_2$ partial mixed streams $F_2+H_2$, $F_3+H_3$, $F_4+H_4$ and $F_5H_5$ to each subsequent catalyst bed again the same inlet temperature of 210° C. was adjusted for each bed. After all the split of the total fresh feed was about as follows: 8.5% $F_1$, 12% $F_2$, 17.5% $F_3$, 25% $F_4$ and 37% $F_5$.

It was surprising that this operation of the reactor allowed the adjustment of the average temperature at 245±1° C. for all 5 catalyst beds so that the hydrogenation conditions were approximately the same in all beds. This was also achieved when using another fresh feed with a different composition, which released a considerably different reaction heat due to the different saturation. By varying the proportions of the components, the same temperature could be adjusted in all catalyst beds.

During the test period of more than 1,000 hours there was no indication of activity or yield loss. The average yield structure is summarized in Table 2.

Example 5

The same palm oil as in Examples 2, 3 and 4 was used at 1.0 LHSV based on fresh feed, 50 bang and 900 liters $H_2$ per liter fresh feed in an adiabatic reactor with 3 catalyst beds which contained the same commercial NiMo catalyst as in Examples 2, 3 and 4 in a ratio of 1:1.3:1.6.

Except for the lower number of catalyst beds, the process was conducted in the same way as in Example 4. The specific fraction had a temperature of 288° C. and was added to the partial mixed stream of fresh feed and hydrogen ($F_1+H_1$) in an excess of 3.7 based on the weight of the fresh feed. The temperature at the reactor entrance was 230° C. and the temperature at the exits of all three catalyst beds was almost constant at 275° C. The average yields for the test period of 120 hours are summarized in Table 2. The chemical $H_2$ consumption was determined at 3.18 wt. % based on fresh feed.

TABLE 2

| Example | | 2 | 3 | 4 | 5 |
|---|---|---|---|---|---|
| Fresh feed | | 100.00 | 100.00 | 100.00 | 100.00 |
| chem. H2 consumption | wt. % on feed | 2.24 | 2.31 | 3.30 | 3.18 |
| $C_{4-}$ | wt. % on feed | 5.99 | 6.98 | 5.50 | 5.88 |
| CO | wt. % on feed | 0.29 | 0.33 | not detectable | 0.02 |
| $CO_2$ | wt. % on feed | 7.73 | 7.81 | traces | 0.20 |
| $H_2O$ | wt. % on feed | 6.30 | 6.40 | 12.83 | 12.39 |
| Raffinate | wt. % on feed | 81.93 | 80.82 | 84.97 | 84.59 |

The above test results demonstrate that the process according to the invention is capable of stable operation in a very economic manner without excess burden on the plant and allows to hydrogenate vegetable oil at maximum yield and to suppress the undesired side reactions to CO and $CO_2$.

It is particularly surprising that this result is a achieved with a comparatively low amount of specific fraction which serves as diluting agent or reaction controller.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

The entire disclosures of all applications, patents and publications, cited herein and of corresponding European application No. 09.003.140.2, filed Mar. 4, 2009, are incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. Process for the continuous hydrogenation of triglyceride containing raw materials like vegetable oils in a fixed bed reactor system having several catalyst beds comprising hydrogenation catalyst, which beds are arranged in series, wherein the raw material feed, hydrogen containing gas and diluting agent are passed together through the catalyst beds of the reactor system at hydrogenation conditions, characterized in that
   a) the raw material feed stream is divided into a number of different partial streams $F_1$ to $F_n$ identical to the number of catalyst beds n in the reactor system at a temperature of less than 80° C., the stream of hydrogen containing gas is also divided into the same number of different partial streams $H_1$ to $H_n$ at a temperature of less than 110° C., then partial raw material feed stream $F_1$ and partial stream of hydrogen containing gas $H_1$ are passed to the first catalyst bed, partial raw material feed stream $F_2$ and partial stream of hydrogen containing gas $H_2$ are passed to the second catalyst bed and so on, wherein n is equal to or greater than 2, each partial stream of raw material feed following in downstream direction being that much larger than the preceding one that the weight ratio of diluting agent to raw material feed is essentially the same at the entrance of all catalyst beds and does not exceed 4:1, the term diluting agent comprising the hydrogenation product formed in every catalyst bed as well as added diluting agent as defined below in b),
   b) the temperature at the reactor inlet at the first catalyst bed (after a start-up phase) is adjusted with added diluting agent, which is a specific fraction of the hydrogenation product obtained by the present process, which is recovered from the reactor exit product mixture by separation in two steps without controlled pressure reduction at 145 to 280° C. and 15 to 60° C.,
   c) diluting agent is only added to the streams of raw material feed $F_1$ and hydrogen containing gas $H_1$ entering at the reactor inlet and passing through the first catalyst bed, and
   d) hydrogen is used in excess of the theoretical hydrogen consumption.

2. Process according to claim 1 wherein each partial raw material feed stream is mixed with the corresponding partial stream of hydrogen containing gas to form a partial mixed stream ($F_1+H_1$, $F_2+H_2$ etc.) before entering the reactor system.

3. Process according to claim 1 wherein each partial stream of hydrogen containing gas following in downstream direction is larger than the preceding one by essentially the same factor as the corresponding partial streams of raw material feed with which they are mixed.

4. Process according to claim 1 wherein the hydrogen excess is at least 50%.

5. Process according to claim 4 wherein the hydrogen excess is 75 to 400%.

6. Process according to claim 5 wherein the hydrogen excess is 100 to 300%.

7. Process according to claim 1 wherein the weight ratio of added diluting agent to total raw material feed is less than 1.

8. Process according to claim 7 wherein the weight ratio of added diluting agent to total raw material feed is less than 0.5.

9. Process according to claim 1 wherein the partial feed streams and the corresponding partial streams of hydrogen containing gas are all mixed at the same ratio of standard cubic meter of gas to cubic meter of raw material feed.

10. Process according to claim 1 wherein the amount of the partial streams or the partial mixed streams to the second and, if present, the following catalyst beds is controlled so as to adjust the temperature at the inlet of every catalyst bed to essentially the same temperature as at the reactor inlet at the first catalyst bed.

11. Process according to claim 1 wherein the reactor system comprises less than 10 catalyst beds.

12. Process according to claim 1 wherein the hydrogenation catalyst is selected from one or more sulfided elements of Groups 6, 8, 9 and 10 of the Periodic System, preferably nickel, molybdenum, tungsten and/or cobalt.

13. Process according to claim 1 wherein hydrogenation takes place at a hydrogen partial pressures in the range of 1 to 8 MPa.

14. Process according to claim 1 wherein hydrogenation takes place at temperatures of 145 to 280° C.

15. Process according to claim 1 wherein the LHSV of the raw material feed is from 0.1 to 1 $m^3/m^3$ catalyst/h.

16. Process according to claim 1 wherein the linear velocity of the liquid material is in the range from 1 to 6 mm/s in each bed.

17. Process according to claim 1 wherein the weight ratio of added diluting agent to raw material feed at the reactor entrance is 4:1 or less and each partial stream of fresh raw material feed as well as each partial stream of hydrogen containing gas is by a factor of 1.25 or more larger than the previous partial stream.

18. Process according to claim 1 wherein the triglyceride containing raw materials are processed together with mineral oil.

19. Process according to claim 1 wherein the part of the hydrogenation product, which is not recycled for addition to the streams of raw material feed $F_1$ and hydrogen containing gas H1 entering at the reactor inlet and passing through the first catalyst bed, is further processed to obtain upgraded kerosine or diesel fuels.

* * * * *